United States Patent

Barron et al.

Patent Number: 5,618,025
Date of Patent: Apr. 8, 1997

[54] PROTECTED SOFT SEAT WITH SECONDARY HARD SEAT

[75] Inventors: Kimball R. Barron; Edward J. Merwald, both of Marshalltown, Iowa

[73] Assignee: Fisher Controls International, Inc., Clayton, Mo.

[21] Appl. No.: 652,827

[22] Filed: May 23, 1996

[51] Int. Cl.⁶ .................................................. F16K 25/00
[52] U.S. Cl. ................................. 251/210; 251/332
[58] Field of Search .......................... 251/210, 332, 251/333

[56] References Cited

U.S. PATENT DOCUMENTS

| 117,689 | 8/1871 | Russell . | |
|---|---|---|---|
| 670,083 | 3/1901 | Osborne . | |
| 1,492,980 | 5/1924 | Hodges . | |
| 1,595,786 | 8/1926 | Johnson . | |
| 2,240,521 | 5/1941 | Schnell . | |
| 2,403,028 | 7/1946 | Smith . | |
| 2,610,021 | 9/1952 | Smith . | |
| 3,059,894 | 10/1962 | Knecht et al. | 251/210 X |
| 3,125,122 | 3/1964 | Bermingham | 251/210 X |
| 3,228,651 | 1/1966 | Egashira . | |
| 4,228,987 | 10/1980 | Potter | 251/210 |

OTHER PUBLICATIONS

Fisher Controls EZ Valve Type with soft seat (1 page).
Masoneilan Dual Seated Valve Plug with hard seat and soft seat (2 pages).

Primary Examiner—Kevin Lee
Attorney, Agent, or Firm—Marshall, O'Toole, Gerstein, Murray & Borun

[57] ABSTRACT

A fluid control valve operable in erosive fluid conditions includes a primary soft seat protected by a secondary hard seat. Two dead band areas control the fluid flow on valve opening and closing to spacially separate the soft seat from the flow stream. A diverter is provided to deflect the flow stream away from the soft seat.

11 Claims, 3 Drawing Sheets

5,618,025

PROTECTED SOFT SEAT WITH SECONDARY HARD SEAT

This invention relates to fluid control valves and in particular to fluid control valves for controlling an erosive fluid flow stream containing particulate matter.

BACKGROUND OF THE INVENTION

In certain process systems there is often the need for the interconnecting pipeline to convey an erosive fluid, such as a flow stream containing particulates being transported at times with a high fluid velocity. One example is a system where there is a carryover of an erosive catalyst and wherein contaminants can accumulate within the flow stream.

In such erosive systems, there is a constant requirement to maintain the fluid control valves in good operating condition. In particular, an erosive fluid containing high velocity particulates can rapidly wear the valve seats to the point where in some instances the entire valve trim must be periodically replaced. In very severe circumstances, the valve trim may need daily replacement because of worn valve seats caused by a fast moving erosive fluid and large amounts of damaging particulate matter in the flow stream.

SUMMARY OF THE INVENTION

In accordance with the principles of the present invention, there is provided a fluid control valve which can reliably operate in erosive fluid conditions, such as in controlling a flow stream having high quantities of particulate matter. A valve plug seat is provided with a primary soft seat and a secondary hard metal seat. The soft seat can be made from a plastic material such as polytetrafluoroethylene (PTFE) or other such material that is soft enough to deform without cracking or splitting when loaded. The primary soft seat and secondary hard metal seat of the present invention can be used on any valve plug where the flow is upward into the plug and past the seat, such as on an unbalanced, contoured valve plug configuration. In operation, the primary soft seat on the valve plug will contact the seat ring first and will be loaded until the secondary hard metal seat contacts the seat ring. At this point, any additional valve stem load will load the hard metal seat, which will prevent the soft seat from being overloaded. In addition, there is provided a flow director on the valve plug which diverts the upward flowing flow stream away from the primary soft seat when the valve is in the opened condition allowing the flow stream to pass through the seat.

In addition to the double seat configuration, with the protected soft seat due to the secondary hard metal seat and the flow diverter, there is also provided at least one dead band area of the valve plug which dead band area is provided to be long enough to enable the seating surface of the plug to open far enough to make sure that the available flow area across the seating surfaces is not a flow restriction. This will keep the flow velocity across the valve seating surfaces low. Once the plug travels to the point that the flow stream starts to flow through the valve, the flow deflector or flow diverter in the valve plug will deflect the flow stream away from the plug seating surfaces. This will prevent the seating surfaces from being damaged by direct impingement of the flow stream containing particulate matter or from an otherwise erosive flow stream.

As the valve closes, the dead band area of the plug will once again limit the high velocity flow across the seating surfaces as the valve plug comes into its shut-off position.

In one embodiment of a fluid valve for use in a flow stream containing particulate matter in accordance with the invention, there is provided a valve body having an inlet and an outlet. A seat ring mounted in the valve body is provided between the inlet and the outlet and includes an aperture defining a flow passageway for communicating the flow stream containing particulate matter. The seat ring includes an annular seal rim around the perimeter of the aperture and an annular rigid seating surface extending around the annular seal rim.

A seat ring retainer maintains the seat ring securely mounted within the valve body. A valve plug member slidably mounted within the seat ring retainer includes a soft seat disc of resilient seating material, such as PTFE, for fluid sealing engagement with the annular seal ring and thereby defines a primary seat for the flow stream.

The valve plug member also includes an annular ridge protruding from the valve plug member for fluid sealing engagement with the annular rigid seating surface and thereby defines a secondary seat for the flow stream. The valve plug member includes a plug tip end for insertion into the seat ring aperture and forming at least one dead band area defined by the slidable engagement of the plug tip and the flow passageway interior walls in the seat ring. The defined dead band area controls the flow stream and substantially prevents fluid flow through the flow passageway during an initial opening of the primary and secondary seats to the flow stream. The plug tip end includes an annular shoulder portion transversely extending from the plug tip for deflecting the flow stream through the flow passageway and away from the soft seat disc of resilient seating material.

A second dead band area provided on the valve plug tip and the seat ring enables the provided double dead band area to more selectively control the flow stream. In particular, with the provided double dead band areas the primary and secondary seats can be opened, i.e. unseated, while the flow stream is controlled, by the double dead band areas, from substantially flowing through the seat ring. At about 20% travel of the valve plug away from the seat ring, one dead band area is eliminated while the other dead band area is still effective to control any substantial flow of the flow stream through the valve seat. This enables the primary soft seat seal to be further spacially displaced from the valve seat before the erosive flow stream is permitted to flow through the passageway. Finally, when about 50% travel of the valve plug has been effected, the second dead band area is eliminated so that the flow stream can now be permitted through the seat ring. At this point, the soft seal has been significantly spaced from the seat ring and also the flow deflector is now reliably operable to deflect the flow stream away from the soft seat. At this point the valve plug begins to throttle the flow of fluid through the valve.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
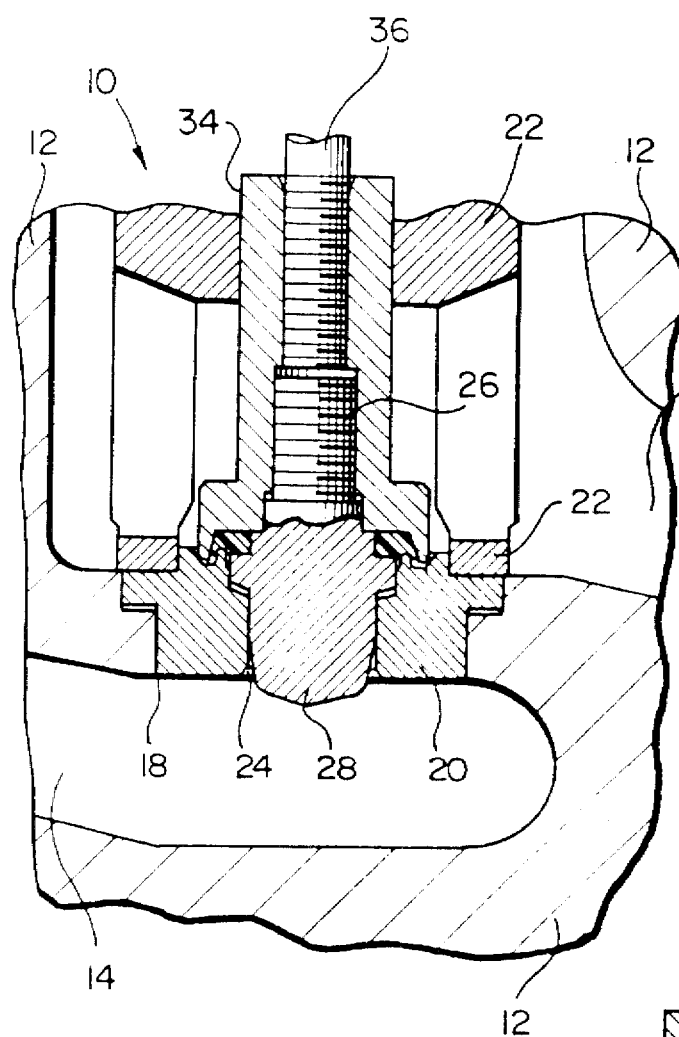
FIG. 1 is a fragmented sectional view illustrating a fluid control valve according to the invention.
Figure 2:
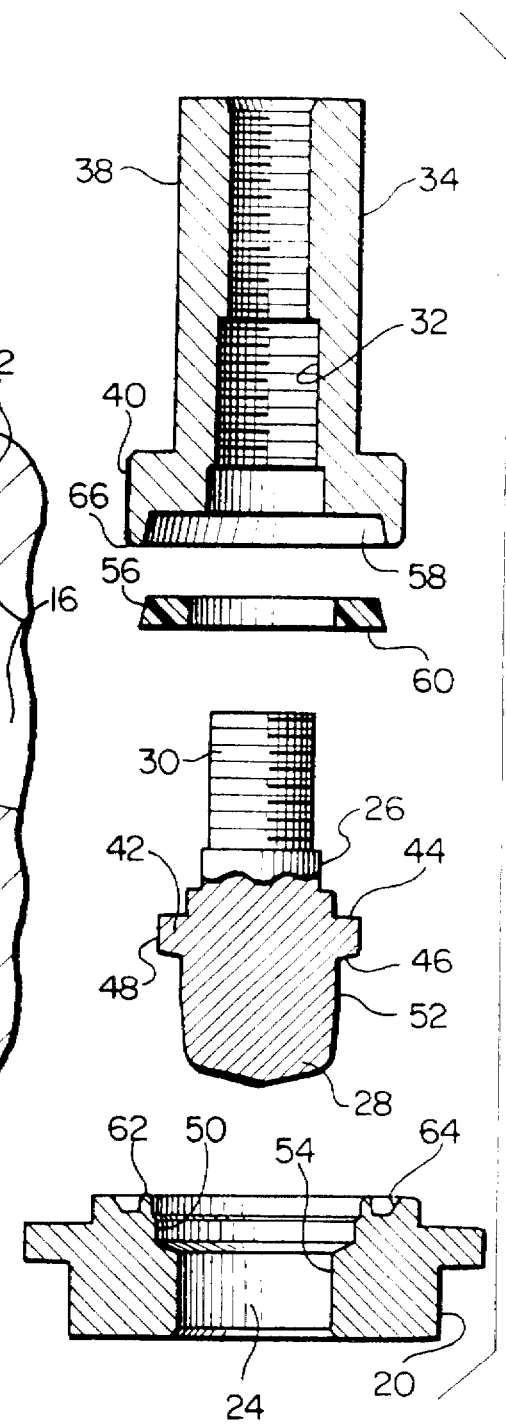
FIG. 2 is an exploded view illustrating the valve plug and valve seat of the fluid control valve of FIG. 1.

FIG. 1 illustrates a fluid valve 10 for controlling a fluid flow stream and particularly an erosive flow stream containing particulate matter. The fluid valve 10 includes a valve body 12 with a fluid inlet 14, a fluid outlet 16, and a valve body bore 18 intermediate the valve inlet 14 and outlet 16. A seat ring 20 is suitably mounted within the valve bore 18 and is securely maintained within the valve body by a seat ring retainer 22 using conventional valve construction.

The seat ring 20 includes a central aperture therethrough which provides a flow passageway 24 through the seat ring 20 and thereby fluidly interconnecting the valve inlet 14 with the valve outlet 16 when the valve is in the opened position. FIG. 1 illustrates the fluid valve 10 in the fully closed position with a protected double seat configuration as will be described more particularly hereinafter.

A valve plug member 26 includes a plug tip 28 at one end and a threaded portion 30 at the other end. The threaded valve plug member portion 30 is adapted to threadably engage a threaded section 32 within a valve plug guide 34, which plug guide is slidably engaged within the seat ring retainer 22. Accordingly, with a valve stem 36 secured such as by threadable mounting within the plug guide 34, the valve plug member 26 is guided for movement within the seat ring retainer 22 through the slidable guiding engagement of a plug guide exterior upper surface 38 and a plug guide exterior lower surface 40 with respective inner surfaces within the seat retainer 22 as shown in FIG. 1. The plug tip 28 includes an annular protruding ridge 42 extending transversely from the plug. The annular ridge 42 is defined by an upper shoulder surface 44, a slanting lower surface 46 and an interconnecting exterior surface 48. The plug exterior surface 48 snugly engages within and against an interior upper surface 50 of the seat ring 20 to form a first, upper dead band area 51 (see FIGS. 3, 4) controlling fluid flow through flow passageway 24 as will be described more particularly hereinafter. A second, lower dead band area 53 for controlling the flow of fluid through passageway 24 is provided by the engagement of a plug exterior surface area 52 with an interior lower surface 54 within the seat ring 20. (See FIGS. 3, 4).

A soft seal ring 56 formed of a soft plastic material such as PTFE or other such resilient material soft enough to deform without cracking or splitting when loaded is provided for location within a suitably shaped cavity 58 at one end of the plug guide 34. The soft seal ring 56 is dimensioned so as to mount on the shoulder surface 44 of the valve plug member 26 and includes a perimeter seal area 60 extending beyond the shoulder surface 44 for sealable engagement with an annular seal rim 62 of the seat ring 20. Seating engagement of the ring seal 56 with the annular seal rim 62 provides a primary seat for the valve 10.

The seat ring 20 also includes an annular rigid seating surface 64 extending around the annular seal rim 62 for fluid sealing engagement with an annular plug ridge 66 provided on the plug guide 34. Seating engagement of the plug ridge 66 on the rigid seating surface 64 of the seal ring provides a secondary seat for the fluid valve 10.

Figure 3:
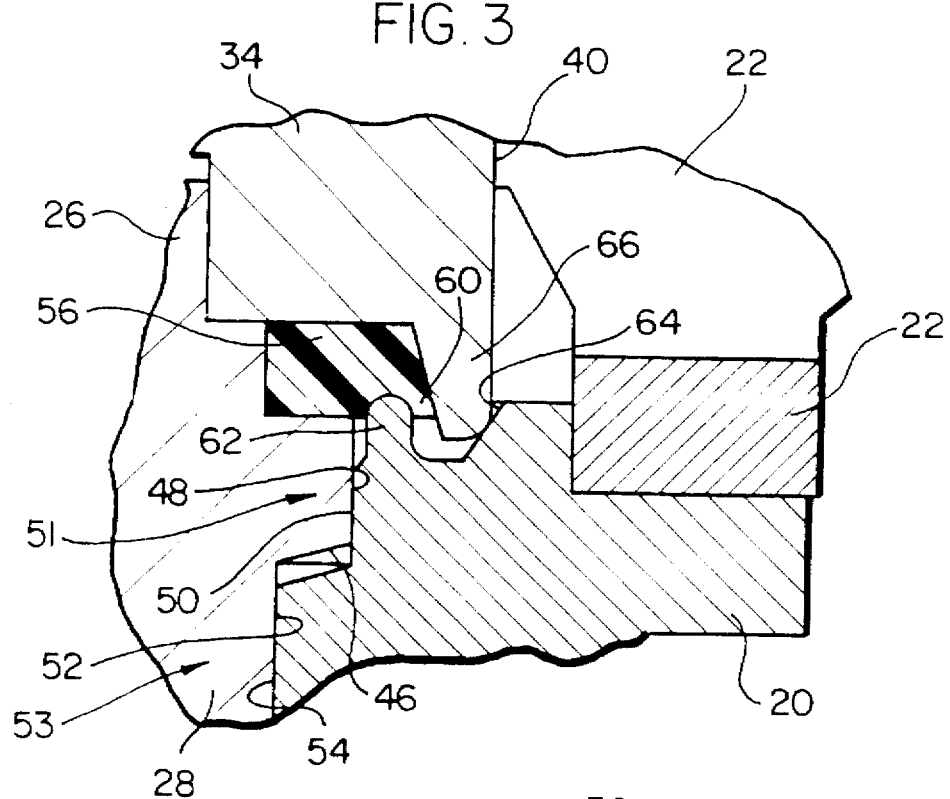
FIG. 3 is an enlarged fragmented view illustrating the primary soft seat and secondary hard seat of the fluid control valve of FIG. 1.

FIG. 3 illustrates in more detail the formation of a primary seat provided by the soft sealing of ring seal 56 with the annular seal rim 62. Also, FIG. 3 illustrates the secondary seat provided by the seating engagement of the annular plug ridge 66 with the annular rigid seating surface 64. Accordingly, because the plug guide and seat ring are formed of metal and the ring seal 56 is formed of a soft, resilient material, the primary seat is a soft seal configuration whereas the secondary seat is a metal to metal or hard seat configuration.

The primary soft seat on the valve plug will contact the seat ring 20 first and will be loaded until the secondary hard metal seat contacts the seat ring. At this point, any additional stem loading will load the hard metal seat which will protect and thereby prevent the soft seat from being overloaded. Also, protection of the soft seat from the erosive fluid flow is provided by the bottom slanting surface 46 of the annular projecting ridge 42 of the valve plug 26, which slanting surface 46 acts as a deflector to deflect the fluid flow away from the perimeter seal area 62 of the soft ring seal 56.

FIG. 3 also illustrates in detail the double dead band areas 51, 53. Upper dead band area 51 is defined by the engagement of the plug exterior surface 48 with the seat ring interior surface 50. Lower dead band area 53 is defined by the engagement of the plug exterior surface 52 and the seat ring interior surface 54.

Figure 4:
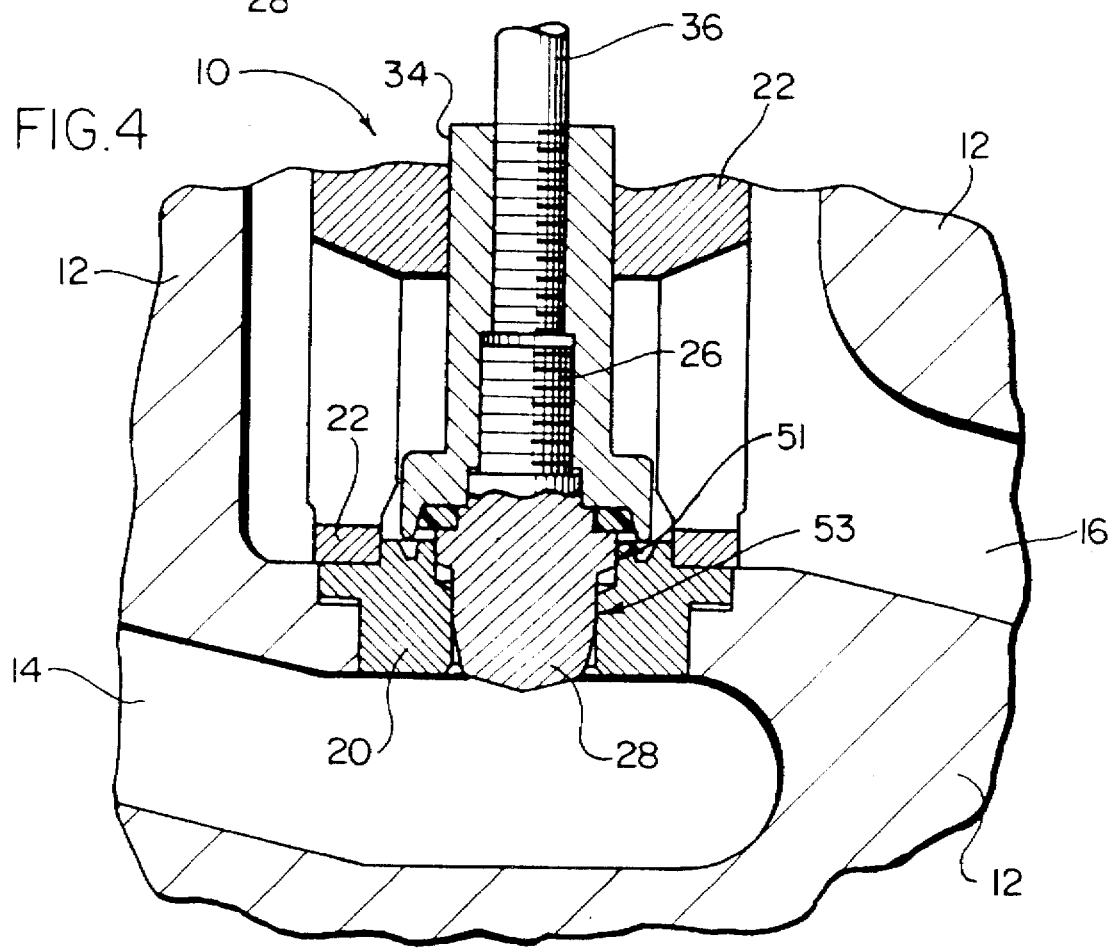
FIG. 4 is a fragmented view illustrating the double dead band areas effective in controlling fluid flow with the primary and secondary seats just becoming disengaged.
Figure 5:
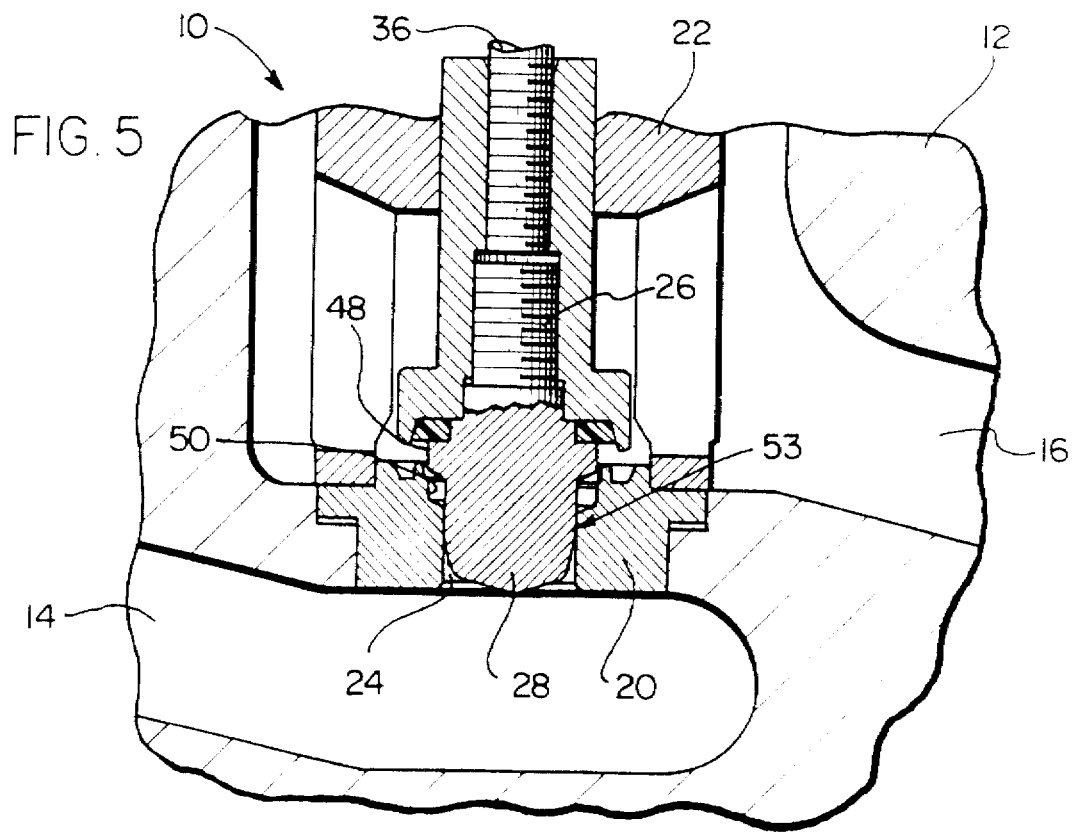
FIG. 5 is a fragmented view illustrating only one dead band area effective with about 20% valve plug travel off the valve seat.
Figure 6:
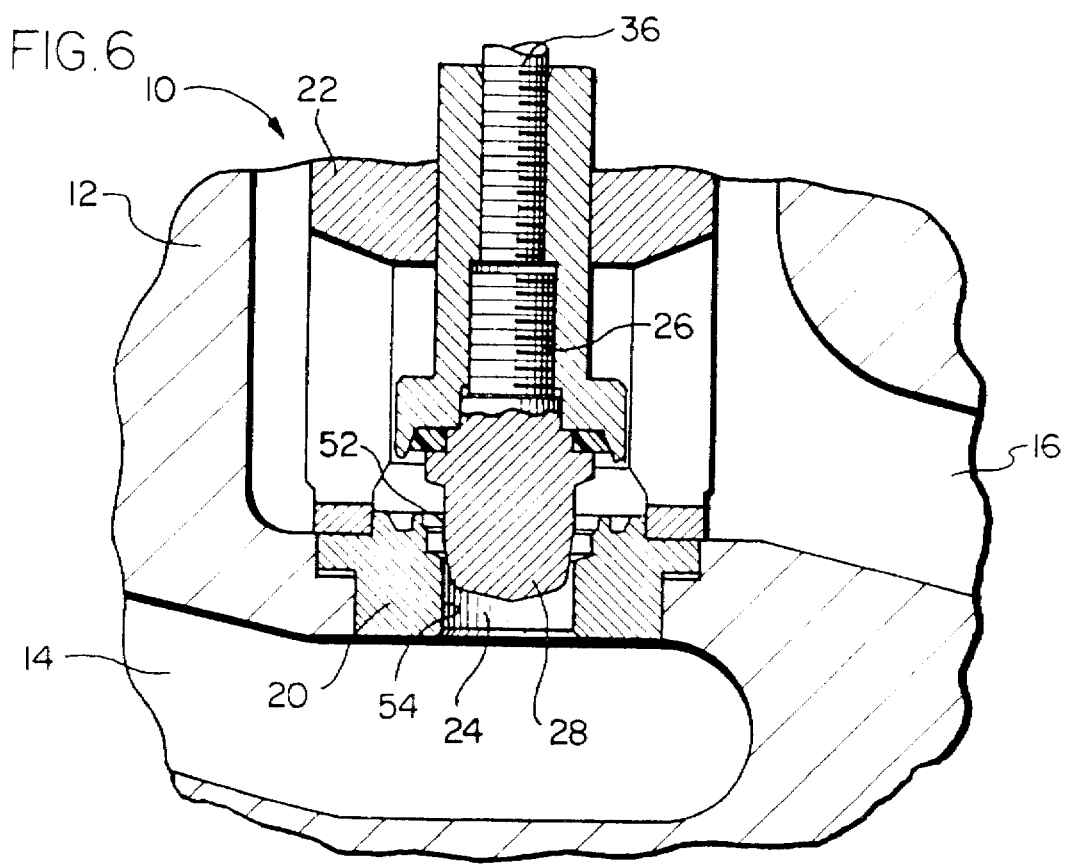
FIG. 6 is a fragmented view illustrating the valve plug travel at about 50% and the flow deflector protecting the primary soft seat.

With reference now to FIGS. 4, 5, 6, the operation of the provided double dead band areas for protection of the soft seal material from the erosive fluid flow will be described. FIG. 4 illustrates a condition wherein the operation of the valve stem 36 has moved the valve plug 26 just off of the seat ring 20. In FIG. 4 it can be seen that the soft ring seal 56 of the primary seat as well as the annular plug ridge 66 of the secondary seat have been moved away from the seat ring. However in this valve position there is little or no fluid flow because of the double dead band areas 51, 53 which provide a length of close clearance fit between the plug and the seat ring. The dead band area of the valve plug is provided to be long enough to enable the seating surfaces of the plug to open far enough to make sure that the available flow area across the seating surfaces is not a flow restriction. This will keep the flow velocity across the seating surfaces low. It may be noted with reference to FIG. 4 that with the valve plug just off the seat, the double dead band areas are still in fitting engagement and effective to limit fluid flow.

FIG. 5 illustrates a condition wherein the valve stem 36 has been operated to continue to move the valve plug number 26 to a point of about 20% travel away from a fully seated condition with the seat ring, shown for instance in the fully seated position of FIG. 1. As can be seen from FIG. 5, the upper dead band area 51 has been eliminated as there no longer is any engagement between the plug surface 48 and the seating surface 50. However, note that the lower dead band area 53 is effective in controlling the flow, in that the exterior surface 52 of the valve plug continues to engage the lower interior surface 54 of the seat ring. Thus, the fluid flow is continued to be controlled so as to be a small amount or a no flow condition, while permitting the soft ring seal 56 to be further spacially separated away from the seat ring before a substantial flow is allowed to travel through the flow passageway 24.

In FIG. 6, the valve stem 36 is operated further to raise the valve plug 26 to a position of about 50% travel from the seat ring 20. As can be seen from FIG. 6, the lower dead band area 53 now is ineffective because the plug exterior surface 52 has been raised and removed from contact with the interior surface 54 of the seat ring. This permits fluid to flow through the passageway 24 from the valve inlet 14 to the valve outlet 16. In the position of the valve as shown in FIG. 6, it can be seen that the soft ring seal 56 has been substantially spaced from the seat ring 20, thus distancing the soft ring seal from the fluid flow. Furthermore, at this point, the flow deflection provided by the slanting surface 46, deflects the flow stream away from the perimeter sealing surface 60 of the ring seal so as to prevent the seating surface from being damaged by direct impingement of the flow stream. This significantly prevents the flow stream from causing flow erosion damage of the soft seating surfaces, which damage normally occurs in conventional valve plug configurations in such erosive conditions. At this 50% travel position of a valve as shown in FIG. 6, the valve plug tip 28 begins to provide throttling of the flow stream.

Accordingly, the flow valve 10 illustrated and described herein provides a soft primary seal as well as a hard secondary seat protecting the primary seal, and further includes two dead band areas to prevent the flow stream from impinging on the soft seating surfaces until the soft seating surfaces have been substantially displaced from the seat ring. In addition, the present valve provides a flow deflector which diverts the flow stream from the soft seal when the fluid starts to flow through the valve and throttling of the fluid flow becomes effective.

It is to be understood that the concepts of the invention can be used on any valve configuration where the flow is upward into the valve plug and past the seat. The most common use of the principles of the present invention would be on an unbalanced, contoured valve plug. The valve of the present invention provides a long lasting seat design which is highly desirable in dirty and erosive fluids where the present invention will protect the primary soft seal from direct impingement of the flow stream.

The foregoing detailed description has been given for clearness of understanding only, and no unnecessary limitations should be understood therefrom, as modifications will be obvious to those skilled in the art.

It is claimed:

1. In a fluid valve for use in a flow stream containing particulate matter, including a valve body having an inlet and an outlet, the improvement comprising:

a seat ring mounted in said valve body between said inlet and said outlet and having an aperture defining a flow passageway for communicating said flow stream containing particulate matter;

said seat ring including an annular seal rim around the perimeter of said aperture and an annular rigid seating surface extending around said annular seal rim;

a seat ring retainer maintaining said seat ring mounted within said valve body;

a valve plug member slidably mounted within said seat ring retainer, including (1) a soft seat disc of resilient seating material for fluid sealing engagement with said annular seal rim and thereby defining a primary seat for said flow stream, and (2) an annular ridge protruding from said valve plug member for fluid sealing engagement with said annular rigid seating surface and thereby defining a secondary seat for said flow stream;

said valve plug member having a plug tip for insertion into said seat ring aperture and forming at least one dead band area defined by the slidable engagement of said plug tip and said seat ring for controlling said flow stream and substantially preventing flow through said flow passageway during an initial opening of said primary and secondary seats to said flow stream.

2. A fluid valve according to claim 1, wherein said plug tip includes an annular shoulder portion transversely extending from said plug tip for deflecting said flow stream through said flow passageway and away from said soft seat disc of resilient seating material.

3. A fluid valve according to claim 2, wherein said annular shoulder portion includes a slanting surface for deflecting said flow stream away from said soft seat disc.

4. A fluid valve according to claim 2, including a second dead band area defined between said plug tip and said seat ring.

5. A fluid valve according to claim 4, wherein said first and second dead band areas are sequentially operable to control the flow stream.

6. A fluid valve according to claim 1, wherein said primary seat is engaged before the engagement of said secondary seat to prevent overloading of said soft seal.

7. In a fluid valve for use in a flow stream containing particulate matter, including a valve body having an inlet and an outlet, the improvement comprising:

a seat ring mounted in said valve body between said inlet and said outlet and having an aperture defining a flow passageway for communicating said flow stream containing particulate matter;

said seat ring including an annular seal rim around the perimeter of said aperture and an annular rigid seating surface extending around said annular seal rim;

a seat ring retainer maintaining said seat ring mounted within said valve body;

a valve plug member slidably mounted within said seat ring retainer, including (1) a soft seat of resilient seating material for fluid sealing engagement with said annular seal rim and thereby defining a primary seat for said flow stream, and (2) an annular ridge protruding from said valve plug member for fluid sealing engagement with said annular rigid seating surface and thereby defining a secondary seat for said flow stream;

said valve plug member having a plug tip for insertion into said seat ring aperture and forming at least one dead band area defined by the slidable engagement of said plug tip and said seat ring for controlling said flow stream during opening and closing of said primary and secondary seats.

8. A fluid valve according to claim 7, wherein said plug tip includes an annular shoulder portion transversely extending from said plug tip for deflecting said flow stream through said flow passageway and away from said soft seat disc of resilient seating material.

9. A fluid valve according to claim 8, including a second dead band area defined between said plug tip and said seat ring.

10. A fluid valve according to claim 9, wherein said first and second dead band areas are sequentially operable to control the flow stream and substantially prevent flow through said flow passageway during an initial opening of said primary and secondary seats.

11. A fluid valve according to claim 10, wherein said primary seat is engaged before the engagement of said secondary seat to prevent overloading of said soft seal.

* * * * *